United States Patent Office 3,036,733
Patented May 29, 1962

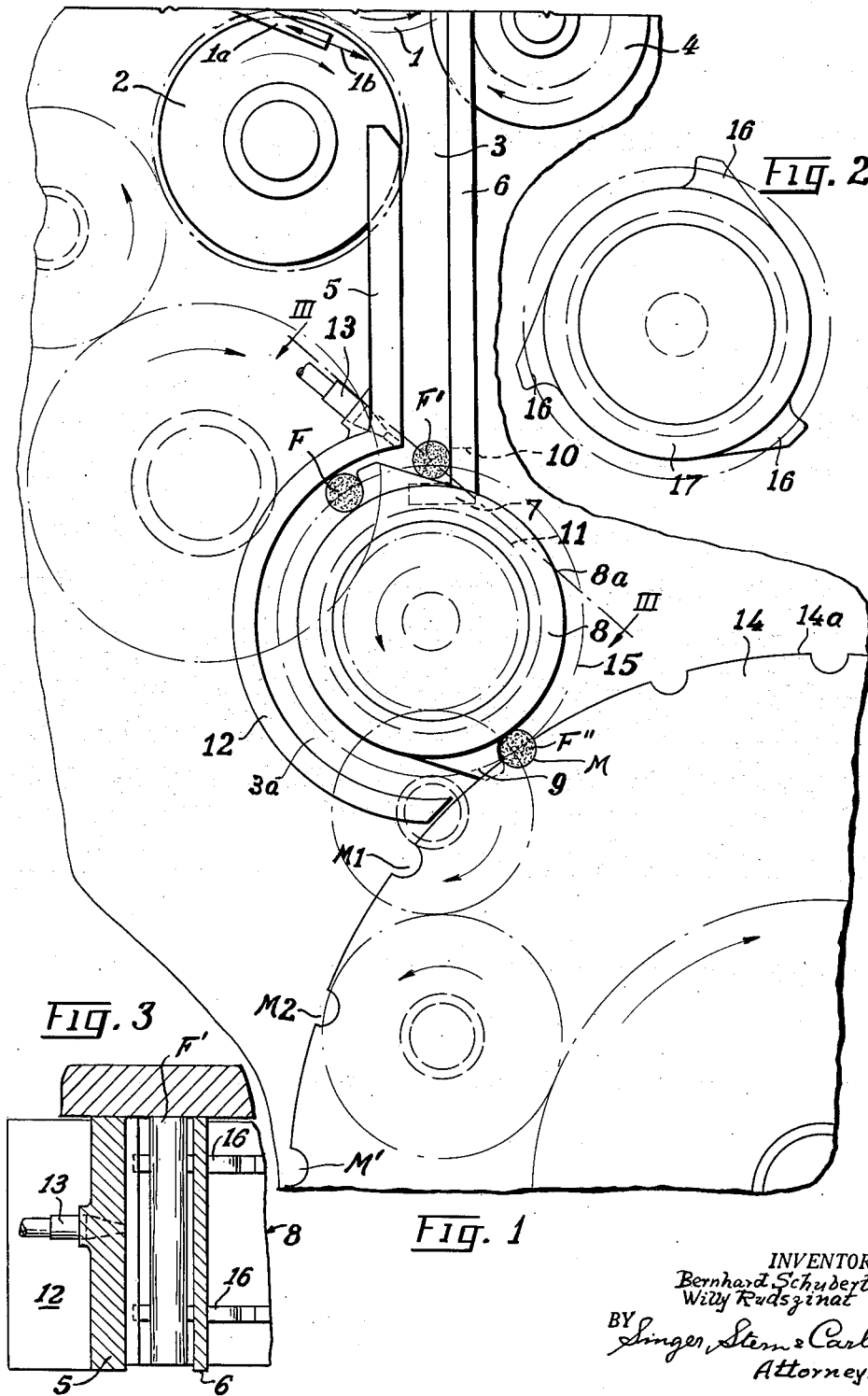

3,036,733
FILTER TIP CIGARETTE MAKING MACHINES
Bernhard Schubert and Willy Rudszinat, Hamburg-Lohbrugge, Germany, assignors to Hauni-Werke Körber & Co. K.G., Hamburg-Bergedorf, Germany
Filed Nov. 28, 1958, Ser. No. 777,109
Claims priority, application Germany Dec. 13, 1957
4 Claims. (Cl. 221—237)

The invention relates to filter tip cigarette making machines and particularly to a device for placing rod-shaped articles, for instance, cigarettes, cigarillos, filter rods or the like into axially extending grooves arranged on the circumference of rotary conveyor drums.

It is known to employ rotary cam members which are arranged at the end of a feed channel feeding rod-shaped articles, for instance, cigarettes, cigarillos, filter rods or the like, into axially extending grooves arranged on the circumference of a rotary conveyor means, for instance, a rotary drum, whereby the cam members engage one rod-shaped member at a time and transfer the lowermost rod-shaped article in the channel to a groove in said drum. The feed channel receives the rod-shaped articles from a funnel shaped magazine.

Owing to the pressure of the stack of the rods above the lowermost rod, for instance a filter rod, the latter slides on the conveyor drum and since on the other hand, due to the high output of modern filter tip cigarette making machines only a very short period of time is available for the transfer of said rod into the groove on the conveyor drum it was already proposed previously in the Ritscher et al., United States Patent 2,918,197 issued December 22, 1959, to hold back the lowermost filter rod of the stock in the feed channel by a stationary stop until a projection on the cam member reaches said stop and places the rod into the groove of the conveyor drum.

This cam member is preferably designed in form of a cam roller provided with a projection on its circumference. The side of the projection facing the filter rod is shaped corresponding to the curvature of the rod, while the opposite side of the projection is shaped to follow the surface of the rotary cam roller so that the rods can continuously slide downwardly in the feed channel. The above mentioned Patent No. 2,918,197 also discloses the arrangement of a plurality of cam rollers for instance, three which are arranged in such a manner in cooperative relation with the conveyor drum that at any one time only every third groove on the conveyor drum is associated with one of the three cam rollers.

The present invention relates to an improvement of devices of this type art, in that different transfer conditions for the conveyor drum are created in case the same machine is used for feeding into each second, or third, or fourth groove of the conveyor drum. In the manufacture of filter tip cigarettes, the individual filter-tips are relatively short and therefore they are fed in lengths which are, for instance six times the length of the actually used filter-tips onto the grooved drum of the filter tip cigarette making machine. These long filter rods are cut in the machine by two circular knives into three filter bodies each being of a double length. The filter bodies of each filter rod obtained in this manner, have to be deposited upon another grooved drum in axial relation with and between two axially spaced cigarettes which are arranged in the grooves of this other drum.

The improvement of the present invention over the above mentioned Patent No. 2,918,197 consists in this, that only a single cam roller is provided for feeding filter rods of different multiple length into the filter tip cigarette making machine, without changing the transmission gears in the machine. This object of this invention is attained by making the circumferential length of the cam roller divisible by the desired multiple of the double length of the filter rod, and in that the number of the projections which are uniformly distributed along its circumference is equal to the quotient from the length of the circumference and the multiple, whereby the length of said circumference is determined by the smallest number by which all the multiples are divisible.

It thus becomes possible by a suitable number and arrangement of the projections on the cam rollers, or by an exchange of cam roller by another roller, to adjust the machine to different feed conditions. In the case of rods of twice the double final lengths the cam roller is provided with three projections which will place the rods into each second groove. For rods of three times the final length the cam roller is provided with two projections which deposit the rods into each third groove. Since in this case the speed of the cam roller and the diameter of same are not changed, a change in the driving elements is not necessary. Only the cam rollers will have to be exchanged, or the projections on the same will have to be adjusted.

In the practical application of this invention, it was found that the lowermost filter rod in the feed channel of the magazine should be additionally supported to prevent any displacement or slipping as a result of the pressure of the stack, or vibratory movements of the machine. Compressed air was found to be the simplest and most effective means for this purpose when applied to the filter rod in the approximate direction bisecting the angle which is formed by the rear wall of the magazine and the adjacent stop. This arrangement is particularly necessary when the feed chute for the filter rods is arranged substantially vertically and the longitudinal center of said chute passes through the axis of the roller. In this case the stop surface is approximately horizontal, so that the danger that the lowest filter rod may roll out of the feed channel is even greater than in the device described in Patent No. 2,918,197. One embodiment of the device in accordance with the present invention is diagrammatically shown in the accompanying drawing, in which:

FIG. 1 is an elevational view showing the device with a cam roller for filter rods of three times the double final length of the filter body.

FIG. 2 is an elevational view showing a cam roller for filter rods of twice the double length of the final length of a filter body, and FIG. 3 is a cross-sectional view along the line III—III of FIG. 1.

The filter rods are discharged from a magazine 1 by a to and fro movement of the inclined bottom plate 1a of the magazine as indicated by the double arrow 1b. A circular roller 2 conducts the filter rods into the vertical feed channel 3.

Another roller 4 rotates in a direction opposite to the feed direction and raises the filter rods in the magazine 1, thus preventing any damming-up filter rods in the magazine outlet. The filter rods slide downwardly into the feed channel, the broadsides of which are formed by the walls 5 and 6. A horizontal stop 7 is provided on the lowermost end of the wall 6 to extend at a right angle thereto. The lowermost filter rod in the channel will engage and rest upon this stop 7.

A cam roller 8 is arranged directly below the channel 3 so that the projections 9 on the roller 8 may pass through slots 10 in the wall 6 and in the stop 7 and remove the lowermost rod from the stop 7. The stop. 7 also projects into annular grooves 11 in the cam roller 8. The upper horizontal surface of the stop 7 is disposed slightly above the highest point of the circumference 8a of the roller 8, so that the lowermost filter rod will not come in contact with said circumference 8a. The vertical portion of the wall 5 terminates at a proper distance from the stop 7 and then continues as shown at 12 concentrically about the roller 8 in spaced relation thereto to provide a concentric feed channel 3a.

The distance between the two vertical channel walls 5 and 6 is slightly greater than the diameter of the filter rods so as to prevent any wedging of the filter rods in the feed channel 3. When the filter rods slide downwardly or when the machine vibrates, it may happen that the lowermost filter rod will fall from the stop 7 without being positively engaged by the cam projection 9 and will slide along the guide wall 12 and through the channel 3a onto the drum 14a and perhaps into a groove which is not intended for this particular filter rod. In order to prevent this, a compressed air nozzle 13 is arranged at the junction between the wall 5 and the concentric wall 12. The compressed air discharged by the nozzle 13 prevents any undesired movement of the lowermost filter rod. The compressed air has no disadvantageous effects on the engagement of the filter rod by the projection 9 which can remove the filter rod in the same manner as intended. In case it is desired to omit the small braking action of the compressed air at the time the filter rod is removed from the channel 3, it is possible, without any difficulty to control the discharge of air from the nozzle 13 in dependence of the movement of the projection 9 in such a manner that the discharge of the compressed air will be interrupted at the moment the filter rod is removed from the stop 7.

The operation of the device is as follows: The filter rods are continuously discharged by the magazine 1 and pass through the channel 3 to the stop 7. The cam roller 8 engages with its projections 9 the lowermost filter rod F, removes the latter from the stop 7 and along the concentric wall 12 to the grooved drum 14. The next filter rod F' slides along the backface of the projection 9 onto the stop 7. The pitch circle of the grooves M2 on the drum 14 correspond to that of the cam roller 8. The filter rods F and F' are disposed with their axis in the circular path of movement 15. The diameter of the cam roller 8 is selected in such a manner that the roller may be used for both modifications of the present invention illustrated in the FIGS. 1 and 2. The cam roller 8 according to FIG. 1 can be used for filter rods having, three times the length of double length filters and the cam roller 17 according to FIG. 2 can be used for filter rods having twice the length of double length filters. Accordingly the length of the circumference of the circular path of movement 15 must be 2×3=6 times the spacing of the grooves. The two projections 9 of the roller 8 in FIG. 1 are spaced a distance of three grooves from each other. The three projections 16 on the cam roller 17 are spaced a circumferential distance equal to the circumferential spacing of two grooves from each other on the drum 14.

According to FIG. 1 a filter rod F'' is placed in the groove M of the conveyor or cutting drum 14. The filter rod F is then deposited, after an appropriate rotation of the cam roller 8 and the cutting drum 14 into the groove M'. The grooves M1 and M2 between the grooves M and M' remain empty and will be filled after the cutting of the filter rods into three double length filter rod bodies. This depositing of the empty grooves will not be discussed at this time, because it does not concern the present invention. When the cam roller 17 as shown in FIG. 2 is inserted in the device in place of the cam roller 8 and one of its projections 16 should transfer a filter rod F'' into the groove M, the following projection 16 will then transfer the next filter rod F' into the groove M2. This will leave the groove M1 empty so that every second groove will be filled with a filter rod.

What we claim is:

1. Means for feeding a cigarette filter rod comprising $n$ double-length filter tips into every $n$th one of a plurality of axially extending grooves on the circumference of a rotary assembly drum so that each of said filter rods may subsequently be cut on said drum into $n$ double-length filter tips of which $n-1$ may be transferred one to each of the $n-1$ grooves between each pair of grooves receiving said filter rods, comprising substantially vertical channel means extending downwardly toward the circumference of said drum from a filter rod magazine and adapted to accommodate a single stack of said filter rods, stop means at the bottom of said channel means for supporting the lowermost filter rod in said stack of filter rods in a position parallel with the grooves in said drum, feed roller means mounted between said drum and the bottom end of said channel means for rotation about an axis parallel with that of said drum, outwardly extending projections evenly distributed around the circumference of said feed roller means, and slots in the lower end portion of said channel means to permit passage of said projections therethrough for removal of the lowermost filter rod from said channel means, the number of said projections equaling $c:n$ where $c$ is the smallest integral constant that renders said expression $c:n$ an integer for all the values of $n$ employed, whereby the same drum may be used and the feed roller means may have one and the same minimum diameter for all said values of $n$ employed.

2. Means for feeding a cigarette filter rod comprising $n$ double-length filter tips, into every $n$th one of a plurality of axially extending grooves on the circumference of a rotary assembly drum so that each of said filter rods may subsequently be cut on said drum into $n$ double-length filter tips of which $n-1$ may be transferred one to each of the $n-1$ grooves between each pair of grooves receiving said filter rods, comprising substantially vertical channel means extending downwardly toward the circumference of said drum from a filter rod magazine and having two walls parallel with the grooves in said drum and spaced to accommodate a single stack of said filter rods therebetween, stop means at the bottom of said channel means for supporting the lowermost filter rod in said stack of filter rods in a position parallel with the grooves in said drum, feed roller means mounted between said drum and the bottom end of said channel means for rotation about an axis parallel with that of said drum, outwardly extending projections evenly distributed around the circumference of said feed roller means, slots in the lower end portion of one of said walls to permit passage of said projections therethrough for removal of the lowermost filter rod from said channel means, and guide means extending concentrically around a portion of said feed roller means from the bottom edge of the other wall to said drum and spaced from said feed roller means a distance at least equal to the diameter of said filter rods, the number of said projections being equal to $c:n$, where $c$ is the smallest integral constant that renders said expression $c:n$ an integer for all the values of $n$ employed, whereby the same drum may be used and the feed roller means may have one and the same minimum diameter for all said values of $n$ employed.

3. Means as set forth in claim 2, in which said stop means is substantially horizontal, and nozzle means adjacent to said stop means for directing a blast of compressed air against the lowermost filter rod in the channel means to retain said lowermost filter rod on the stop means.

4. Means for feeding cigarette filter rods from a filter rod magazine into axially extending grooves on the circumference of an asembly drum where said filter rods are subsequently cut and assembled with cigarettes, comprising substantially vertical channel means extending downwardly toward the circumference of said drum from said filter rod magazine and adapted to accommodate a single stack of said filter rods, stop means at the bottom of said channel means for supporting the lowermost filter rod in said stack of filter rods in a position parallel with the grooves in said drum, feed roller means mounted between said drum and the bottom end of said channel means for rotation about an axis parallel with that of said drum, outwardly extending projections evenly distributed around the circumference of said feed roller means, and slots in the lower end portion of said channel means to permit passage of said projections therethrough for removal of the lowermost filter rod from said channel means, the number of said projections equaling $c:n$ where $n$ is the number of double-length filter tips contained in each of said filter rods and $c$ is the smallest integral constant that renders said expression $c:n$ an integer for all the values of $n$ to be used in the machine so that a filter rod comprising $n$ double-length filter tips is deposited in every $n$th groove on the drum where it may subsequently be cut into $n$ double-length filter tips of which all except one are transferred separately to one of the $n-1$ grooves between each pair of filter rod receiving grooves, whereby the same drum and feed roller means of one and the same diameter may be used for all the values of $n$ to be employed in the machine.

References Cited in the file of this patent

UNITED STATES PATENTS

| | | |
|---|---|---|
| 893,203 | Smith | July 14, 1908 |
| 2,550,616 | Stephano | Apr. 24, 1951 |
| 2,570,198 | Brager | Oct. 9, 1951 |
| 2,674,755 | Schlicksupp | Apr. 13, 1954 |
| 2,918,197 | Ritscher et al. | Dec. 22, 1959 |

FOREIGN PATENTS

| | | |
|---|---|---|
| 931,557 | Germany | Aug. 11, 1955 |